INVENTOR
H. W. KOCH
BY E. F. Kane
ATTORNEY

INVENTOR
H. W. KOCH
BY E. F. Kane
ATTORNEY

Patented Mar. 20, 1951

2,545,551

UNITED STATES PATENT OFFICE 2,545,551

AUTOMATIC ELECTRONIC DETECTING AND TESTING APPARATUS FOR SWITCHING SYSTEMS

Herbert W. Koch, Cicero, Ill., assignor to Western Electric Company, Incorporated, New York, N. Y., a corporation of New York Application December 31, 1947, Serial No. 794,971

6 Claims. (Cl. 179—175.25)

This invention relates to testing apparatus for switching systems and more particularly to apparatus for testing the operation of automatic telephone switching systems.

It is an object of this invention to provide apparatus for testing switching systems and more particularly for detecting unstandard conditions such as shorts, opens and reverses between leads of automatic telephone switching systems.

In accordance with one embodiment of this invention, an apparatus is provided whereby the individual leads comprising all possible circuit combinations in a plurality of banks of multiple leads may be progressively tested so as to detect shorts, opens and reverses between leads. The apparatus comprises a plurality of electronic detector circuits which during the course of a test are first-connected to the separate output leads of one bank, and after these leads are automatically tested in successive progression in all of the various circuit combinations they can form, the connections to the detector circuits are automatically transferred to the next bank of leads to progressively test them, etc. until all the banks are tested. The testing apparatus in its operation will cause all of the switching mechanisms in the system to be operated in sequence, and as each lead in one bank is tested, its associated detector circuit will be operated to close a circuit to advance the test to the next lead which, if normal, will operate its associated detector circuit and so on until the last lead in the bank has been tested, whereupon a transfer circuit transfers the detector leads to the next bank of multiple leads to be tested which in turn are progressively tested, the chain of progression being broken when unstandard conditions appear and indications thereof being given by suitable signal devices, such as lamps which by their lighted or unlighted state indicate the condition of the circuit.

A more complete understanding of the invention will be had by the following detailed description taken in conjunction with the accompanying drawings, in which Figs. 1 and 2 considered together comprise a circuit diagram illustrating one embodiment of the invention when viewed with Fig. 1 placed above Fig. 2;

Figure 1:
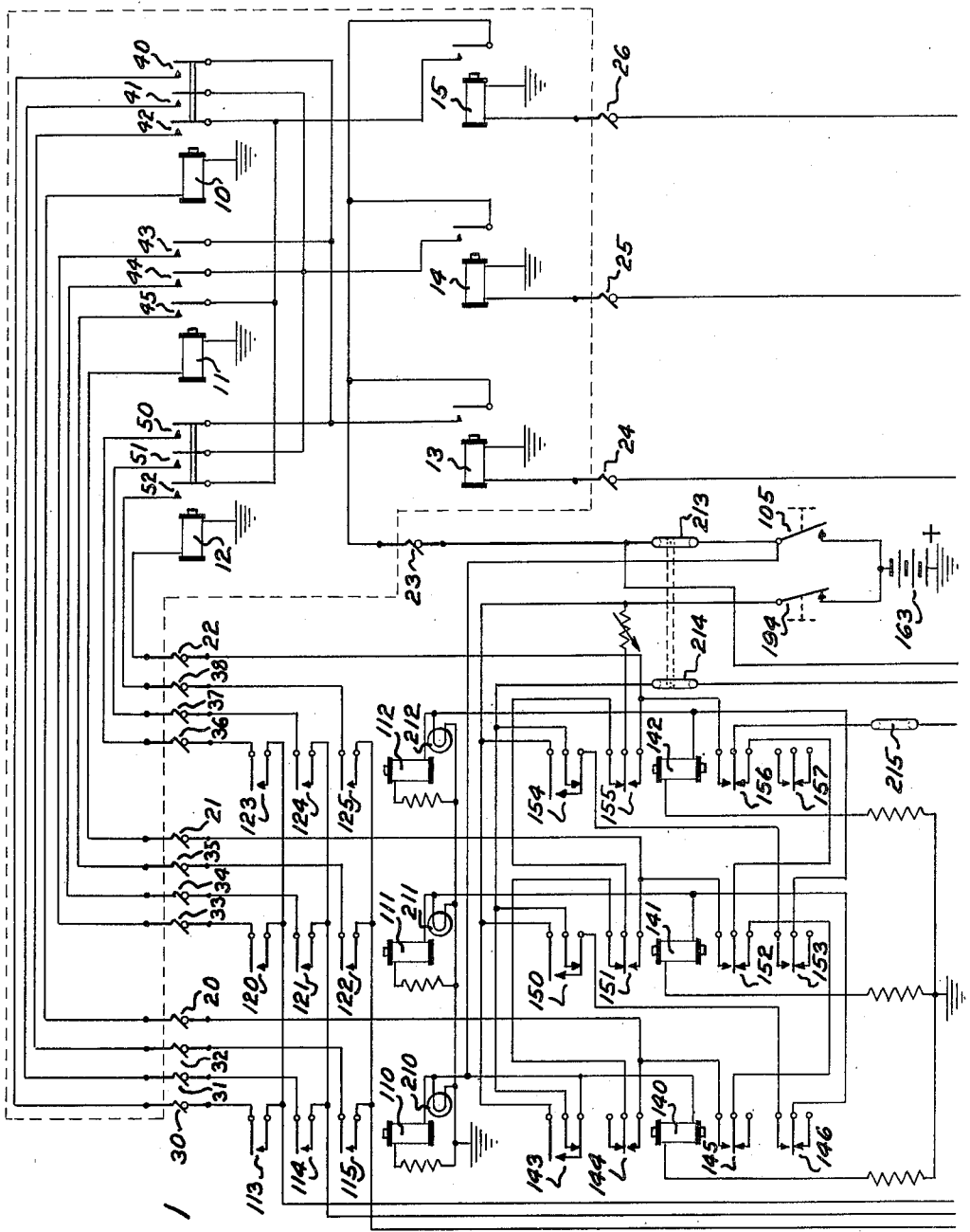
Figure 2:
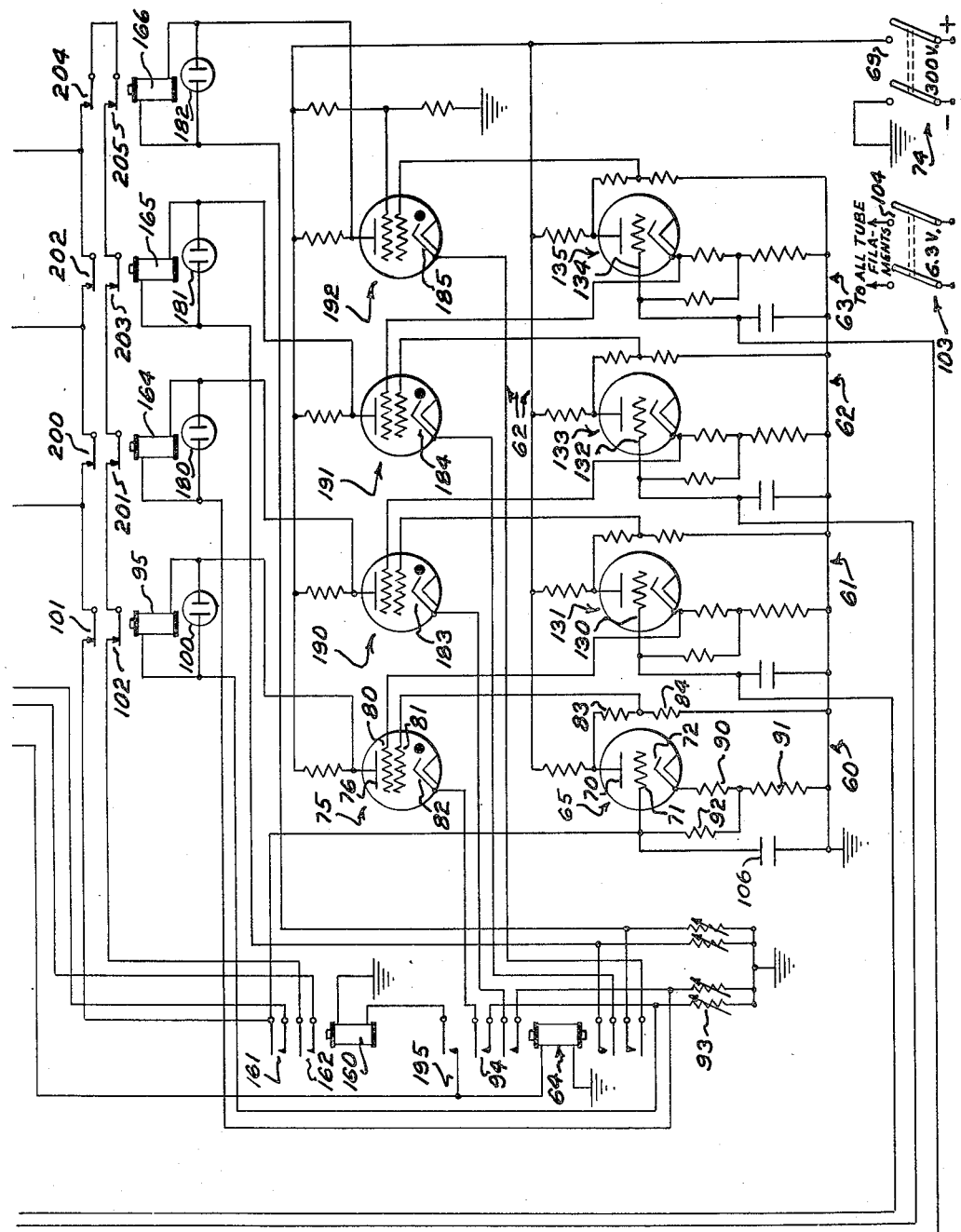

In one phase of crossbar telephone systems operation a subscribers circuit is selected by a series of signal pulses which are first transmitted to a selected frame of crossbar relays in correlated vertical and horizontal banks.

Each frame normally accommodates one thousand subscriber lines numbered from 000 to 999 connected to one thousand sets of terminals on the frame, which terminals are divided into ten blocks numbered from 0 to 9 of one hundred terminal sets numbered from 00 to 99. Each such block is normally called a hundred-block and is connected into the circuit when necessary by what is generally called a one hundred-block relay representing the second digit in a four-digit number system, the first digit being associated with the particular frame selected. In addition, each hundred-block has associated therewith ten ten-block relays and ten unit relays, combinations of which, determine the last two digits in the four-digit number system. For example, signal impulses for a subscriber's number 2345 would be routed to the 2,000 frame and would be further selected by operation of the number 3 hundred-block relay, and the number 4 ten-block relay and the number 5 unit relay associated with the number 3 hundred-block. The selection culminates in a completed line circuit from the input of the frame to the output terminal connection of the particular subscriber's line called.

The foregoing is one example of an automatic telephone system which may be tested by means of the invention disclosed herein. However, in order to completely understand the invention, it is necessary to show only a part of such a system and accordingly only three ten-block relays and three unit relays are shown herein as the system to be tested.

As shown in the drawings, the external circuit (automatic telephone system) to be tested comprises three ten-block relays 10, 11 and 12 and three unit relays 13, 14 and 15 together with leads, contacts and coils associated therewith. The input leads of the system under test are connected to the jacks of a plurality of plug and jack sets 20, 21, 22, 23, 24, 25 and 26, the plugs of which are connected to the test set, and the output leads of the system under test are connected to the jacks of the plug and jack sets 30, 31, 32, 33, 34, 35, 36, 37 and 38, the plugs of which are connected to the testing apparatus. If the relays 10, 11 and 12 represent the tens digits 0, 1 and 2, respectively and the unit relays 13, 14 and 15 represent the units digits 0, 1 and 2, respectively, it is possible to select the following two-digit combinations with the automatic system shown: 00, 01, 02, 10, 11, 12, 20, 21 and 22. The relays in the system under test are provided with sets of make contacts which enable a particular number combination to be selected so that the signal will appear at the proper output lead. Relays 10, 11 and 12 are each provided with three pairs of make contacts as follows: Contacts 40, 41 and 42 are operated by relay 10; contacts 43, 44 and 45 are operated by relay 11; and contacts 50, 51 and 52 are operated by relay 12. Relays 13, 14 and 15 are each provided with one pair of make contacts.

The object of the apparatus is to test the operation of the system for continuity of signal through the plug and jack set 23 to the proper output lead which will be correctly selected only by the proper operation of the relays under test, the test beginning with the output lead representing the number combination 00 connected to the plug 30 and progressively advancing to test signal continuity with the proper relay relation for each output lead. For example, for a signal calling the number combination 21 the signal through the plug jack set 23 should not appear in any other output lead except that connected to the plug jack set 37 when relays 12 and 14 are operated.

The test apparatus is provided with a plurality of detector circuits 60, 61, 62 and 63 associated with a relay 64. All of the detectors 60, 61, 62 and 63, being similar in structure and in operation, only one, for example, detector 60, will be explained in detail. Detector 60 includes a thermionic vacuum tube 65 which may be a triode having an anode 70, a grid 71 and a cathode 72. The anode 70 may be provided with a high positive plate potential from a source 74 through a resistor and a switch 69. The detector 60 also includes a gas-filled tube 75 which has an anode 76, two separate grids 80 and 81 and a cathode 82. A high potential may be supplied to the anode 76 from the source of plate voltage 74. Grid 81 is supplied with a predetermined positive voltage from a voltage divider formed by resistors 83 and 84 connected between the anode 70 and ground. The grid 80 is connected to and normally kept at the same positive potential as the cathode of the vacuum tube in the next succeeding detector unit 61.

Cathode resistors 90 and 91 are connected between the cathode 72 of the tube 65 and ground, and a resistor 92 is connected between the grid 71 and the juncture of resistors 90 and 91. A cathode resistor 93 is connected between the cathode 82 of the tube 75 and ground through make contacts 94 of relay 64 when the relay is operated. When operated, the relay 64 also connects the operating coil of a relay 95 across the tube 75 between the anode 76 and the cathode 82.

Connected across the operating coil of the relay 95 is a visual indicating neon lamp 100 which is fired when sufficient voltage is present to operate the relay and which will cease glowing when the relay is released due to insufficient voltage across its operating coil. The relay 95 is provided with two groups of break contacts 101 and 102.

The drawings show both the testing apparatus and the external circuit to be tested in a completely quiescent state. The constants of the circuit elements in the detector units are such that when the filament and anode voltages from filament voltage source 103 and anode voltage source 74 are applied to the detector tubes by means of switches 104 and 69, predetermined plate current will flow through tube 65, predetermined potentials will appear on the grids 80 and 81 of the tube 75, and sufficient voltage will appear between the anode 76 and the cathode resistor 93 to fire the lamp 100 and also to operate the relay 95 to break the contacts 101 and 102. At this time, the cathode 82 of the tube 75 is not yet connected to ground since the relay 64 has not been operated, and that being the case, the tube 75 cannot be fired regardless of the potentials on its anode and its respective grids. However, the voltage relationships of the elements of the tube 75 would be such at this time that even if the cathode were connected through the cathode resistor to ground, the tube 75 would not be fired.

Assuming that the relay 64 is operated so that the cathode 82 is connected to the cathode resistor 93, then the tube 75 will be fired if the positive potential on grid 81 is increased to a predetermined value which may be effected by applying a sufficiently negative signal to the grid 71 of the tube 65 to reduce the plate current within the tube 65 to such a degree that the potential between the juncture of resistors 83 and 84 is raised to the required level to fire the tube 75. Once the tube 75 is fired, the voltage across the operating coil of the relay 95 is reduced to such an extent that the lamp 100 will be extinguished, and the relay 95 will be released to close contacts 101 and 102. The gas-filled tube 75 will remain fired until relay 64 is released which breaks the cathode circuit. A condenser 106 is connected between grid 71 and ground to dissipate charges accumulated due to the distributed capacity in the circuit under test, thus to prevent false operation of the detector.

The first detector circuit 60, although similar in operation to the other detector circuits 61, 62 and 63, is really an initiating circuit for the detectors and is actuated by initial operation of the starting control in a manner hereinafter described.

Since it is the response in the output leads of the system under test that determines either standard or unstandard conditions in the system, the output leads are connected to the control grids of the triode vacuum tubes of the detectors 61, 62 and 63 in a properly related sequence as the test automatically advances. The connection is made through a group of transfer relays 110, 111 and 112 which, when operated as hereinafter described, first connect the three output leads coming from the contacts of the relay 10 to the detectors, and as the test advances, connect to the detectors the next set of three output leads coming from the contacts of the relay 11 and so on until all the sets of leads have been tested.

Relay 110 controls three sets of make contacts, 113, 114 and 115, the movable elements of which are connected to the plug ends of the plug and jack sets 30, 31 and 32, respectively. The plug ends of the plug and jack sets 33, 34 and 35 are connected to the movable elements of three sets of make contacts 120, 121 and 122 which are controlled by relay 111, and the plug ends of the plug and jack sets 36, 37 and 38 are connected to the movable elements of three sets of make contacts 123, 124 and 125 controlled by relay 112. The fixed contacts of contact sets 113, 120 and 123 are connected through a common lead to the control grid 130 of the triode 131 in the detector 61; the fixed contacts of the contact sets 114, 121 and 124 are connected through a common lead to the control grid 132 of the triode 133 in the detector 62; and the fixed contacts of the contact sets 115, 122 and 125 are connected through a common lead to the grid 134 of the triode 135 in the detector 63.

Associated with the relays 110, 111 and 112 are three multiple relays 140, 141 and 142, each having four sets of make and break contacts; contact sets 143, 144, 145 and 146, operable by the relay 140; contact sets 150, 151, 152 and 153, operable by relay 141; and contact sets 154, 155, 156 and 157, operable by relay 142. A relay 160 is provided with two sets of make contacts 161 and 162 which when closed add links in an electrical chain that sequentially applies the testing voltage to input leads of the system under test and permits operation of relays 111 and 112.

The testing voltage of a predetermined value may be furnished by a battery 163 having its positive side connected to ground.

In the operation of the apparatus, switches 103 and 69 are first closed to provide the necessary conditions in the detector circuits 60, 61, 62 and 63 whereby the relays 95, 164, 165 and 166 are operated to break the contacts associated with the respective relays, these relays being in an operated condition, indicator lamps 100, 180, 181 and 182 will be fired and will glow. It will be remembered that at this stage the cathodes 82, 183, 184 and 185 of their respective tubes 75, 190, 191 and 192 are not connected through the respective cathode resistors to ground at 193 because as yet relay 64 has not been operated.

The test is begun by momentarily closing the starting switch 195, thereby connecting the negative side of the battery simultaneously to the following points: the movable elements of the contacts associated with relays 13, 14 and 15; the fixed contact at contact set 161; and to the operating coils of relay 110 and 140 thereby operating the last said relays.

Operation of relay 110 connects the first set of output leads to be tested from the plug and jack sets 30, 31 and 32 to the control grids 130, 132 and 134, respectively. Operation of the relay 140 performs the following functions: (1) locks the battery circuit through the relay through contacts 143 and a normally closed release switch 194; (2) connects the battery to the operating coil of relay 10 through operated contacts 144, unoperated contacts 151, unoperated contacts 155 and the switch 194; (3) operates relay 64 by connecting its operating coil to the battery through unoperated contacts 156, unoperated contacts 152, operated contacts 145, operated contacts 144, unoperated contacts 151, unoperated contacts 155 and switch 194.

Operation of relay 64 connects the cathodes 82, 183, 184 and 185 of tubes 75, 190, 191 and 192 to ground through their respective cathode resistors to prepare these tubes for firing. Operation of relay 64 also connects battery over the operating path of relay 64 to the operating coil of relay 160 through a set of make contacts 195, thereby operating relay 160 and closing contacts 161 and 162. Closure of contacts 161 applies negative battery potential from battery 163 through operated contacts 143 to the grid 71 of the tube 65, thereby blocking the normal flow of anode current through that tube, increasing the voltage drop across the tube and correspondingly across the voltage divider 83—84 to such an extent that the positive potential on the grid 81 of the tube 75 will be increased to the level required to fire the tube 75. The tube 75 having been fired will then conduct current and the voltage across the relay 95 and the lamp 100 will be dropped below the operating point of the relay and the lamp, releasing the relay and extinguishing the lamp.

Release of the relay 95 closes contacts 101 and 102, and the closure of contacts 101 connects the battery 163 through the plug and jack set 24 to the operating coil of the relay 13, operating the same and closing its contacts to connect the battery to the grid 130 of the tube 131 through the closed contacts 40 of operated relay 10 and the closed contacts 113 of the operated relay 110. Thus, a negative blocking voltage is applied to the grid 130 resulting in the firing of the tube 190, the extinguishing of the lamp 180, the release of the relay 164 and the closure of the contacts 200 and 201 of the relay 164 in a manner similar to the manner in which tubes 65 and 75 were fired and relay 95 released.

Closure of contacts 200 operates relay 14 to connect battery to the grid 132 of tube 133 through the closed contacts of relay 14, the closed contacts 41 of relay 10 and the closed contacts 114 of relay 110 thus resulting in the extinguishing of the lamp 181, release of the relay 165 and the closure of the contacts 202 and 203 of the relay 165. The closure of the contacts 202 operates relay 15 to connect battery to the grid 134 of tube 135 through closed contacts of relay 15, closed contacts 42 of relay 10, and closed contacts 115 of relay 110. As a result, the lamp 182 is extinguished, the relay 166 is released and the contacts 204 and 205 of the relay 166 are closed.

It will be apparent at this stage of the test that the indicator lamps 100, 180, 181 and 182 having been extinguished in sequence and indication has been given that the bank of output leads through the contacts 40, 41 and 42 have passed the test successfully and that the relays 10, 13, 14 and 15 have operated correctly.

Closure of contacts 204 and 205 initiates advancement of the test to the bank of output leads connected to the contacts of relay 11 by having closed the last link in an electrical chain to connect the battery to the operating coils of the relays 111 and 141 to operate the same. The electrical chain follows a path from the battery through switch 194, operated contacts 143, operated contacts 161, closed contacts (relays released) 101—200—202—204—205—203—201—102, operated contacts 162, unoperated contacts 150 and operated contacts 146, thence through windings of relays 111 and 141 to ground.

Operation of relay 111 connects the output leads from the relay 11 at the plug and jack sets 33, 34 and 35 to the grids of the triodes 131, 133 and 135 through contacts 120, 121 and 122, respectively. Operation of relay 141 performs the following: (1) locks battery to the relay 141 through operated contacts 150 and operated contacts 146; (2) releases relay 10 by cutting off the battery through operated break contacts 151 thereby opening contacts 40, 41 and 42 and disconnecting that part of the output of the system under test from the detector leads connected to the grids of the triodes in the detectors; (3) connects battery to relay 11 through operated contacts 151 and unoperated contacts 155; (4) momentarily releases relay 64 and reoperates it by first breaking the battery connection at the break contacts 151 and reestablishing the battery connection to the relay 64 through make contacts 151 and 152 and unoperated break contacts 156.

Momentary release of relay 64 momentarily releases relay 160 by breaking contacts 195 and also momentarily opens the cathode circuits of the tubes 75, 190, 191 and 192 thereby returning these from a conducting state to a quiescent state thus resulting in the relighting of the lamps 100, 180, 181 and 182 and in the relays 95, 164, 165 and 166 being operated to open the contacts, reestablishing the cathode circuits after the momentary release does not fire the tubes 75, 190, 191 and 192 since at this stage the tubes 65, 131, 133 and 135 are at their normal state without any foreign signal on their grids.

Momentary release of relay 160 momentarily breaks contacts 161 to remove the battery potential from the grid 71 of the tube 65 just long enough for the rest of the circuit to prepare itself for the second round of the test which is touched off when after its momentary release, relay 160 is reenergized to close its contacts 161 and 162. Closure of contacts 161 applies negative battery potential to the grid 171 of tube 65 resulting in the extinguishing of the lamp 100, the release of relay 95 and the closure of contacts 101 and 102. Closure of contacts 101, as before, connects battery to the operating coil of relay 13, and the test progresses as in the first round, the detectors 61, 62 and 63 being successively operated through the output leads connected at plug and jack sets 33, 34 and 35 to sequentially apply battery voltage to relays 14 and 15, and contacts 204 and 205 being closed at the end of the first test round, the test is transferred to the output leads connected at plug and jack sets 36, 37 and 38.

The transfer is started by battery reaching unoperated contacts 154 through the electrical chain which was completed by closure of contacts 204 and 205. Through the contacts 154 and operated contacts 153 battery is connected to the operating coils of relays 142 and 112 to operate the same. Operation of relay 112 closes contacts 123, 124 and 125 to connect the last set of output leads 36, 37 and 38 from the system under test to the detectors 61, 62 and 63.

Operation of relay 142 accomplishes the following: (1) battery is locked to relays 142 and 112 by operated contacts 154 and through operated contacts 153; (2) releases relay 11 by cutting off the battery through operated break contacts 155 thereby opening contacts 43, 44 and 45 to disconnect that part of the output of the system under test from the detector leads connected to the grids of the triodes in the detectors; (3) causes operation of relay 12 by connecting battery to the operating coil of relay 12 through operated contacts 155 thereby connecting the output leads from the contacts of relay 12 to the detector grids through the operated contacts of relay 112; (4) momentarily releases relay 64 and reoperates it by first breaking the battery connection at the break contacts 155 and reestablishing the battery connection to relay 64 through make contacts 155 and 156.

As hereinbefore described, the momentary release and reenergization of relay 64 results in: (1) removing for a short period a negative battery potential from the grid 71 of the tube 65 while the rest of the circuit is restored to normal for the third round of test; (2) momentary break in the cathode circuits of tubes 75, 190, 191 and 192 to restore the tubes to a quiescent state thereby operating relays 95, 164, 165 and 166 and firing lamps 100, 180, 181 and 182.

The third round of the test is initiated in the same manner as the previous round by negative battery voltage being applied to grid 71 of tube 65 upon reoperation of relay 160 after it is released. The test proceeds as before but this time relay 12 is operated and relays 10 and 11 are unoperated thereby testing the output circuits through contacts of relay 12. At the end of this round the test is completed.

Summarizing the foregoing testing results, it will be seen that just before the first group of three output leads was tested the indicating lamps were lit and as the testing for each lead was completed, the indicating lamps were sequentially extinguished until the last of the group of three was tested, then a transfer was made to the next group of three leads to be tested, and the test circuit was restored to normal with the indicating lamps again lighted, and as before when each of the leads in this group was tested, the lamps were again sequentially extinguished and so on until the test was completed. It is apparent that the extinguishing of an indicator lamp is an indication that the output lead connected to the detectors associated with that lamp is normal provided the lamp prior thereto is also extinguished. By the same token, when any indicating lamp is not extinguished, an unstandard condition is indicated in the output lead connected to the particular detector associated with the unextinguished lamp.

Since the lamp still remains lighted, the relay associated with it will remain operated and the advance of the test is halted because of the open contacts in that relay.

Some of the unstandard conditions which may occur in a system under test and which this apparatus will detect are shorts between leads, reverses between leads and open circuits in the leads. Since the automatic progression of this test apparatus is very rapid, isolation of trouble location will be facilitated by filament type indicating lamps 210, 211 and 212 associated with relays 110, 111 and 112 and connected as shown in the drawings. The last lighted lamp of these three lamps will indicate in which group of three output leads the unstandard conditions exist.

The results of an open circuit in a particular lead being tested are obvious since the particular detector triode connected to that lead will fail to receive the negative blocking voltage on its grid. As a result, the relay associated with the particular detector circuit will remain operated thereby failing to add a link in the electrical chain to advance the test. This particular condition will be indicated by the lamp associated with that detector circuit remaining lighted. For example, if it is assumed that there is an unstandard open condition in the output circuit of the system under test connected at plug and jack set 34, the test will progress as follows: The lamps 95, 164, 165 and 166 are first normally lit. The lamp 210 lights to indicate that the first group of three output leads is being tested then as the sequential test of these three leads has been completed, advancement of the test to the next group of three leads will be indicated by the lighting of lamp 211 and the test will progress to extinguish lamps 100 and 180, and there the advancement of the test will stop, lamps 181 and 182 remaining lighted. Lamp 181 being the first lamp remaining lighted indicates an open in the second lead in the particular group of three being tested and the lamp 211 being the last remaining lighted lamp across the relays 110, 111 and 112 indicates that the advancement of the test was stopped during the test of the second group of three being tested, thus the open circuit is isolated. An open circuit is therefore shown in the lead connected to the detector associated with the first remaining lighted lamp.

Figure 3:
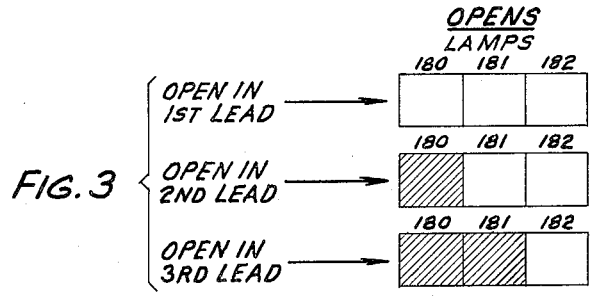
Fig. 3 is a chart illustrating the condition of the indicator lamps of the last three detectors in cases of open circuits in the leads under test, each horizontal row representing the indication of an open in a different lead. The shadowed squares represent extinguished lamps, and the white squares represent lighted lamps.

Fig. 3 of the drawings is a chart showing the effect of an open circuit in any one of three leads of the group being tested. Each horizontal row of squares in that figure represents the indicator lamps 180, 181 and 182 read from left to right. The lighted or unlighted condition of each lamp is indicated by the color of the square, the white squares indicating lighted lamps and the dark squares indicating extinguished lamps. The legends on the left side of the chart indicate in which lead of the group of three leads being tested the unstandard open circuit exists.

A short circuit between any two output leads of a group of three that are being tested will result in the simultaneous application of the negative battery potential to the tube detectors connected to these leads. If the shorted leads are adjacent leads, for example the two leads connected to the grids 130 and 132 of the detectors 61 and 62, then the higher number detector 62 will be operated to extinguish the lamp 181, but the lower number detector 61 will not be fired for the following reason: the cathode of each triode is connected to the shield grid of the gas-filled tube in the preceding detector circuit, and the circuit constants are such that when the battery voltage is applied to the grid of any one of the triodes, the voltage at the cathode of that triode, and consequently that on the shield grid of the gas-filled tube in the preceding detector, is of such value that firing of that gas-filled tube will be blocked, and consequently its associated lamp will remain lighted, and the relay will remain operated to keep the electrical chain broken. Going back to the leads in the system under test connected to the grids 130 and 132, the voltage at the cathode of the tube 133 will be such as to block the operation of the gas-filled tube 190 resulting in the lamp 181 being extinguished, the lamp 180 remaining lighted and the advance of the test being broken. This condition is pictured on the top horizontal line of squares of the chart shown in Fig. 4. The central square corresponding to the lamp 181 is shown blacked out, the first and third squares showing the lamps lighted.

Figure 4:
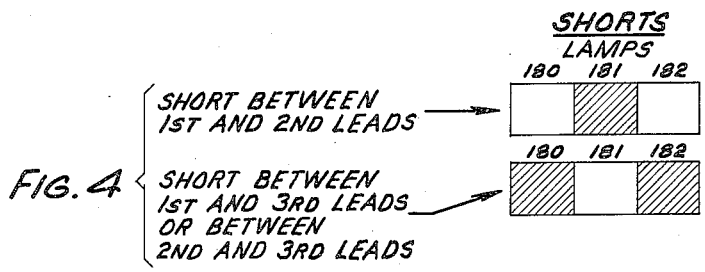
Fig. 4 is a chart illustrating the lighted and unlighted detector lamp indications in cases of shorts between leads under test.

The lamps will provide the same indication for short circuits between the output leads connected to the grids 130 and 134 and between the output leads connected to the grids 132 and 134 as shown in the second horizontal row of squares in Fig. 4, the first and third square indicating extinguished lamps. The last lead having the trouble condition is known and to further locate which of the two preceding leads are shorted with the third lead, the test circuit is first broken by opening the switches 213 and 214, which may be ganged, then a switch 215 is momentarily opened and closed. These operations restore the detector circuit to normal and prevent any false starts. Next the negative battery voltage is applied to the grid 134 by means of a probe connected to the negative side of the battery. If the lead connected to grid 132 is the one shorted with the lead connected to the grid 134, then the only lamp that will be extinguished will be the third one; that is, lamp 182. However, if a short exists between the leads connected to grids 130 and 134, then when the negative battery potential is applied to the grid 134, gas-filled tubes 190 and 192 will be fired and lamps 180 and 182 will be extinguished.

A reverse between the output leads of the system under test will result in the wrong detector operation and the firing of the wrong gas-filled tube. A reverse between the first two output leads will result in extinguishing lamp 181 and in lamp 180 remaining lighted and in the automatic advance being stopped. The reverse between the first and third leads will result in lamps 180 and 181 remaining lighted and the lamp 182 will be extinguished. A reverse between the second and third output leads will result in lamps 180 and 182 being extinguished and lamp 181 remaining lighted. These conditions are pictured in that order in the chart shown in Fig. 5.

Figure 5:
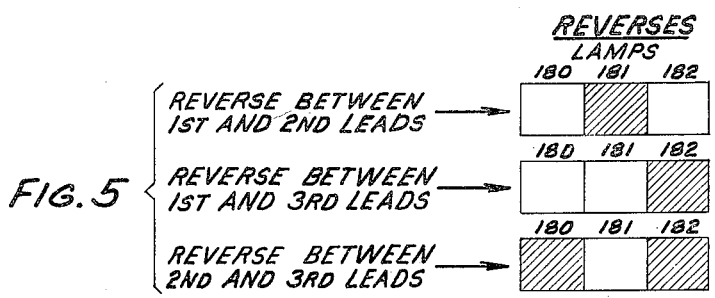
Fig. 5 is a chart illustrating the lighted and unlighted detector lamp indications in cases of reversed leads under test.

The lamp 100 is not shown in the charts of Figs. 3, 4 and 5 to avoid confusion. When lamp 100 is extinguished it merely indicates that its associated detector 60 circuit has been operated when the test is started.

It will be apparent that an automatic telephone system having more groups of output leads and more leads in each group may be tested by an apparatus similar to the one described by having added thereto the required number of detector circuits and the necessary transferring relays which would be operated and connected in substantially the same manner as those described herein.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing in automatic succession the leads of a switching system which has therein a first plurality of leads connectable individually to a plurality of other leads, each of said leads having input and output ends, switching means for controlling an element of the switching system to interconnect an output end of one of said leads to an input end of one of said other leads, a starting circuit for initiating a test, a plurality of thermionic tubes, each having an anode, a control element and a cathode, switching means for individually connecting the output ends of the other leads to the control elements of individual ones of said tubes, switching means for applying a predetermined voltage to the input end of one lead of the first plurality of leads, and switching means controlled by said thermionic tubes, including a gas filled tube and a relay for connecting a succeeding lead of the first plurality of leads to the means for supplying a predetermined voltage, thereby to test a second set of leads.

2. An apparatus for testing in automatic succession the leads of a switching system which has therein a first plurality of leads connectable individually to a plurality of other leads, each of said leads having input and output ends, switching means for controlling an element of the switching system to interconnect an output end of one of said leads to an input end of one of said other leads, a starting circuit for initiating a test, a plurality of thermionic tubes, each having an anode, a control element and a cathode, switching means for individually connecting the output ends of the other leads to the control elements of individual ones of said tubes, switching means responsive to the starting circuit for applying a predetermined voltage to the input end of one lead of the first plurality of leads, and switching means controlled by said thermionic tubes, including a gas filled tube and a relay for connecting a succeeding lead of the first plurality of leads to the means for supplying a predetermined voltage, thereby to test a second set of leads.

3. An apparatus for testing in automatic succession the leads of a switching system which has therein a first plurality of leads connectable individually to a plurality of other leads, each of said leads having input and output ends comprising switching means for causing an element of the switching system to interconnect one of said first plurality of leads to one of said second plurality of leads, a starting circuit for initiating a test, a plurality of thermionic tubes, each having an anode, a control element and a cathode, switching means for individually connecting the output ends of the leads of the second plurality of leads to the control elements of individual ones of said tubes, switching means for applying a predetermined voltage to the input end of one lead of the first plurality of leads, switching means controlled by said thermonic tubes, including a gas filled tube and a relay for connecting a succeeding lead of the first plurality of leads to the means for supplying a predetermined voltage, thereby to test a second set of leads, and switching means responsive to the closure of the proper connections in the switching system between the first of said first plurality of leads and all of the second plurality of leads for interconnecting successive ones of the second plurality of leads sequentially through the first plurality of leads to the control elements of the plurality of thermionic tubes.

4. In a circuit for testing a plurality of interconnectable switching leads in automatic succession, a series of detector units, one of which serves to initiate a succession of tests, each detector unit including a thermionic tube having an anode, a cathode and a control element, means for connecting the output ends of said leads to the control elements of the other detector tubes, each of said leads being connected to a separate tube, a source of predetermined voltage, means for applying said voltage to the input end of a lead connectable to said leads having their output ends connected to the detector means, including a relay and a gas filled tube individual to each thermionic tube and operable when said predetermined voltage is applied to the control element of the thermionic tube associated therewith, means operable to effect the interconnection of said leads and effective to connect said source to the input end of the next lead in succession, the output end of which lead was connected to the next detector's control element, and means for applying said predetermined voltage to the control element of the detector which serves to initiate the test.

5. An apparatus for testing the leads of a switching system which has therein a plurality of leads connectable individually to a plurality of other leads, comprising a set of detector and transfer circuits, each including a thermionic tube having an anode, a control element and a cathode and a gas filled tube having a cathode and plate and two control grids, means for supplying voltage tending to operate the switching system, means including one of said detector and transfer units for controlling the application of said voltage to the switching means, means for connecting said voltage source to one of the leads of the switching means, means for connecting other leads of the switching means to the control elements of the thermionic tubes, means for transferring said voltage source automatically to successive ones of switching elements in the switching means, said last mentioned means being operable under control of said detector and transfer circuits, and means interconnecting the cathode of each thermionic tube with a control grid of the gas filled tube in the previous set of transfer and detector circuits for rendering the gas filled tube ineffective if the grid of the higher detector has a predetermined voltage applied to it before the gas tube fires.

6. An apparatus for testing the leads of a switching system which has therein a plurality of leads connectable individually to a plurality of other leads, comprising a set of detector and transfer circuits, each including a thermionic tube having an anode, a control element and a cathode and a gas filled tube having a cathode and plate and two control grids, means for supplying voltage tending to operate the switching means, means including one of said detector and transfer units for controlling the application of said voltage to the switching means, means for connecting said voltage source to one of the leads of the switching means, means for connecting other leads of the switching means to the control elements of the thermionic tubes, means for transferring said voltage source automatically to successive ones of switching elements in the switching means, said last mentioned means being operable under control of said detector and transfer circuits, and means interconnecting the anode of each thermionic tube with a control grid of its associated gas filled tube to block the gas filled tube when said voltage source is applied to the control element of the associated thermionic tube.

HERBERT W. KOCH.

REFERENCES CITED

The following references are of record in the file of this patent:

UNITED STATES PATENTS

| Number | Name | Date |
|---|---|---|
| 1,742,235 | Cooley | Jan. 7, 1930 |
| 1,977,703 | Swartwout | Oct. 23, 1934 |
| 2,187,784 | Hersey | Jan. 23, 1940 |
| 2,238,126 | Meyers | Apr. 15, 1941 |
| 2,266,503 | Long | Dec. 16, 1941 |
| 2,393,236 | Corey | Jan. 22, 1946 |